(12) United States Patent
Piccione et al.

(10) Patent No.: US 6,419,894 B1
(45) Date of Patent: Jul. 16, 2002

(54) PROCESS FOR PREPARING ZEOLITES HAVING MEL STRUCTURE USING 2,2-DIETHOXYETHYLTRIMETHYLAMMONIUM STRUCTURE DIRECTING AGENT

(75) Inventors: Patrick M. Piccione; Mark E. Davis, both of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/823,669

(22) Filed: Mar. 30, 2001

Related U.S. Application Data

(60) Provisional application No. 60/257,826, filed on Dec. 22, 2000.

(51) Int. Cl.⁷ ................................................ C01B 39/36
(52) U.S. Cl. ................. 423/705; 423/713; 423/DIG. 29
(58) Field of Search ................................ 423/705, 713, 423/DIG. 29

(56) References Cited

U.S. PATENT DOCUMENTS 3,709,979 A  *  1/1973  Chu
6,277,355 B1 *  8/2001  Kennedy et al. ............ 423/705

FOREIGN PATENT DOCUMENTS

WO    WO 95/09812 A1    4/1995

OTHER PUBLICATIONS

Kokotailo et al., Nature, Sep. 1978, 275, 119.
Keijsper et al., Zeolites: Facts, Figures, Future, 1989.

* cited by examiner

*Primary Examiner*—David Sample
(74) *Attorney, Agent, or Firm*—Richard J. Sheridan

(57) ABSTRACT

Zeolites having the MEL crystal structure are made using 2,2-diethoxyethyltrimethylammonium cation as the structure directing agent.

12 Claims, No Drawings

PROCESS FOR PREPARING ZEOLITES HAVING MEL STRUCTURE USING 2,2-DIETHOXYETHYLTRIMETHYLAMMONIUM STRUCTURE DIRECTING AGENT

This application claims the benefit of U.S. Provisional Application Serial No. 60/257,826, filed Dec. 22, 2000.

BACKGROUND OF THE INVENTION

1. Field of the Invention

The present invention relates to a process for preparing crystalline zeolites having the MEL structure using an organic structure-directing agent ("SDA") comprising a 2,2-diethoxyethyltrimethylammonium cation.

2. State of the Art

ZSM-11, a zeolite having the MEL structure, was first prepared by Kokotailo et al. in 1978 using tetrabutylammonium (TBA) as the organic structure-directing agent (SDA). (See Kokotailo et al., *Nature*, 1978, 275, 119.) Soon after, it became apparent that the material made by the TBA-mediated synthesis was actually a ZSM-11/ZSM-5 intergrowth, and that pure phase MEL was quite difficult to prepare. In 1994, Nakagawa et al. provided the first synthesis procedure for pure-phase MEL, utilizing 3,5-dimethylpiperidinium derivatives as SDAs (see WO 95 09812).

The present invention involves the use of an oxygen-containing SDA to prepare MEL zeolites. While there have been previous reports of oxygen-containing SDAs, such as 1,3,5-trioxane (see Keijsper et al., *Zeolites: Facts, Figures, Future*, 1989) or crown ethers (see French Patent No. 364352), the most successful of these systems relied on the formation of alkali metal-ether complexes in order to provide a positive charge to the SDA.

SUMMARY OF THE INVENTION

In accordance with the present invention, there is provided a process for preparing a zeolite having the MEL crystal structure which comprises:

(a) preparing an aqueous solution comprising a source of an oxide selected from the group consisting of oxides of silicon, germanium or mixtures thereof; and a 2,2-diethoxyethyltrimethylammonium cation;

(b) maintaining the aqueous solution under conditions sufficient to form crystals of a zeolite having the MEL crystal structure; and (c) recovering the zeolite crystals.

The present invention also provides the above process wherein the aqueous solution further comprises a source of boron oxide.

Also provided is the above process wherein the aqueous solution further comprises a source of alkali metal oxide.

The present invention also provides a process wherein the aqueous solution further comprises a source of boron oxide and a source of alkali metal oxide.

Further provided by the present invention is a crystalline material composition, as-synthesized and in the anhydrous state, having the MEL crystal structure and whose general formula, in terms of oxide mole ratios is:

$Q/YO_2 \, 0.03-0.05$ where Y is silicon, germanium or mixtures thereof and Q is 2,2-diethoxyethyltrimethylammonium cation.

Further provided by the present invention is a crystalline material composition, as-synthesized and in the anhydrous state, having the MEL crystal structure and whose general formula, in terms of oxide mole ratios is:

$Q/YO_2 \, 0.03-0.05$ $M^+/YO_2 \, 0.0005-0.25$ where Y is silicon, germanium or mixtures thereof; Q is 2,2-diethoxyethyltrimethylammonium cation and M is an alkali metal cation.

The present invention also provides a crystalline material composition, as-synthesized and in the anhydrous state, having the MEL crystal structure and whose general formula, in terms of oxide mole ratios is:

$YO_2/B_2O_3 \, 50$ or higher $Q/YO_2 \, 0.03-0.05$ where Y is silicon, germanium or mixtures thereof and Q is 2,2-diethoxyethyltrimethylammonium cation.

The present invention also provides a crystalline material composition, as-synthesized and in the anhydrous state, having the MEL crystal structure and whose general formula, in terms of oxide mole ratios is:

$YO_2/B_2O_3 \, 50$ or higher $Q/YO_2 \, 0.03-0.05$ $M^+/YO_2 \, 0.0005-0.25$ where Y is silicon, germanium or mixtures thereof; Q is 2,2-diethoxyethyltrimethylammonium cation and M is an alkali metal cation.

DETAILED DESCRIPTION OF PREFERRED EMBODIMENTS

In one embodiment the present invention comprises:

(a) preparing an aqueous solution comprising sources of oxides capable of forming zeolites containing the MEL crystal structure and an organic SDA comprising a 2,2-diethoxyethyltrimethylammonium cation;

(b) maintaining the aqueous solution under conditions sufficient to form crystals of said zeolite; and (c) recovering the crystals of said titanium-containing zeolite.

The Structure-Directing Agent

The SDA useful in the present process is a 2,2-diethoxyethyltrimethylammonium cation (DEOTA) that is capable of acting as a SDA to form zeolites having the MEL crystal structure. The SDA has a molecular structure of the general formula:

$$CH_3-\underset{\underset{CH_3}{|}}{\overset{\overset{CH_3}{|}}{N^+}}-CH_2-CH\underset{O-CH_2-CH_3}{\overset{O-CH_2-CH_3}{<}} \quad X^-$$

X⁻ is an anion which is not detrimental to the formation of the titanium-containing zeolite, such as those described below.

The anion for the salt may be essentially any anion such as halide or hydroxide which is not detrimental to the formation of the zeolite. As used herein, "halide" refers to the halogen anions, particularly fluorine, chlorine, bromine, iodine, and combinations thereof. Thus, representative anions include hydroxide, acetate, sulfate, carboxylate, tetrafluoroborate, and halides such as fluoride, chloride, bromide, and iodide. Hydroxide and iodide are particularly preferred as anions.

The Preparation of MEL Zeolites

The process of the present invention comprises forming a reaction mixture containing sources of an oxide of silicon, germanium or mixtures thereof (Y); an organic SDA comprising a DEOTA cation (Q); water; and, optionally, a source of boron oxide and/or a source of alkali metal oxide (M), said reaction mixture having a composition in terms of mole ratios within the following ranges:

| Reactants | General | Preferred |
|---|---|---|
| $OH^-/YO_2$ | 0.2–0.8 | 0.4–0.7 |
| $Q/YO_2$ | 0.2–1.0 | 0.4–0.6 |
| $H_2O/YO_2$ | 15–100 | 20–50 |
| $YO_2/B_2O_3$ | 20 and higher (i.e., $YO_2/B_2O_3$ can be ∞ when no boron is present) | 28 and higher |
| $M+/YO2$ | 0.0.25 | 0.05–0.10 |

The reaction mixture may be prepared using standard zeolite preparation techniques. Typical sources of silicon oxide include silica hydrogel, tetraalkyl orthosilicates, and fumed silica. A typical source of boron oxide is boric acid. The preferred alkali metals are sodium and potassium.

In preparing the MEL zeolites according to the present invention, the reactants and the templating agent are dissolved in water and the resulting reaction mixture is maintained at an elevated temperature until crystals are formed. The temperatures during the hydrothermal crystallization step are typically maintained at about 135° C. It has been found that higher temperatures (e.g., 150° C.) may cause decomposition of the DEOTA, and that lower temperatures (e.g., 115° C.) can result in the formation of an amorphous product and/or layered products. The crystallization period is typically greater than about 20 days.

The hydrothermal crystallization is usually conducted under pressure and usually in an autoclave so that the reaction mixture is subject to autogenous pressure. The reaction mixture can be stirred during crystallization.

Once the crystals have formed, the solid product is separated from the reaction mixture by standard mechanical separation techniques, such as filtration. The crystals are water-washed and then washed with acetone and dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals of zeolites containing the MEL crystal structure both to direct and accelerate the crystallization, as well as to minimize the formation of any undesired crystalline phases. When seed crystals are used, typically 0.1% to about 10% of the weight of silica used in the reaction mixture are added.

Due to the unpredictability o f the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The MEL zeolite products made by the process of this invention have an as-synthesized composition comprising, in terms of mole ratios in the anhydrous state, the following:

$Q/YO_2 0.03–0.05$ where Y is silicon, germanium or mixtures thereof and Q is 2,2-diethoxyethyltrimethylammonium cation When alkali metal is present, the MEL zeolite products made by the process of this invention have an as-synthesized composition comprising, in terms of oxide mole ratios, the following:

| | |
|---|---|
| $Q/YO_2$ | 0.03–0.05 |
| $M^+/YO_2$ | 0.005–0.25 | where Y is silicon, germanium or mixtures thereof; Q is 2,2-diethoxyethyltrimethylammonium cation and M is an alkali metal cation.

When boron oxide is present, the MEL zeolite products made by the process of this invention have an as-synthesized composition comprising, in terms of mole ratios in the anhydrous state, the following:

| | |
|---|---|
| $YO_2/B_2O_3$ | 50 or higher |
| $Q/YO_2$ | 0.03–0.05 | where Y is silicon, germanium or mixtures thereof and Q is 2,2-diethoxyethyltrimethylammonium cation.

When both alkali metal and boron oxide are present, the MEL zeolite products made by the process of this invention have an as-synthesized composition comprising, in terms of mole ratios in the anhydrous state, the following:

| | |
|---|---|
| $YO_2/B_2O_3$ | 50 or higher |
| $Q/YO_2$ | 0.03–0.05 |
| $M^+/YO_2$ | 0.005–0.25 | where Y is silicon, germanium or mixtures thereof; Q is 2,2-diethoxyethyltrimethylammonium cation and M is an alkali metal cation.

The following examples demonstrate but do not limit the present invention.

EXAMPLES

There are numerous variations on the embodiments of the present invention illustrated in the Examples which are possible in light of the teachings supporting the present invention. It is therefore understood that within the scope of the following claims, the invention may be practiced otherwise than as specifically described or exemplified.

In the following examples, Ludox HS-40 colloidal silica (duPont) is used as the silica source in all syntheses. Aqueous solutions of NaOH (50%, Fisher) and KOH (45%, Aldrich) are employed as the sources of sodium and potassium. Boric acid (Baker) is used as the source of boron. Tetrabutylammonium hydroxide is in the form of an aqueous solution (45%, Aldrich). Iodomethane (99%) and 2,2-diethoxyethyldimethylamine (95%) are also available from Aldrich.

X-ray diffraction (XRD) powder patterns are collected on a Scintag XDS 2000 diffractometer using Cu Kα radiation. The solid-state NMR measurements are performed with Bruker Avance500 and Avance200 spectrometers using magic angle spinning (MAS). $^{11}$B spectra were obtained at 64.22 MHz with a spinning speed of 4 kHz.

Example 1

Preparation of 2,2-Diethoxyethyltrimethylammonium Hydroxide

DEOTA iodide is prepared by the reaction of 12.22 g (76 mmol) 2,2-diethoxyethyldimethylamine with 18.24 g (129 mmol) methyl iodide in 250 mL ethyl acetate. After reaction at room temperature for 19 hours, a white precipitate is formed. The solid is recovered by suction filtration and washed with excess ethyl acetate. The quaternary salt is recrystallized from a mixture of ethyl acetate and ethanol (overall yield: 88%). 19.15 g of DEOTA iodide is dissolved in 180.40 mL water to yield a solution of approximately 0.35 mol/L. This solution is ion exchanged two times over BioRad Ag 1-X8 hydroxide ion exchange resin. The resulting solution is concentrated by rotary evaporation and titrated with 0.1 N HCl to determine the degree of ion exchange (98%). The final hydroxide concentration is 2.45 mmol/g.

Example 2

Synthesis of All-Silica MEL Zeolite (No alkali metal)

A typical synthesis procedure for the crystallization is as follows: 2.45 g of DEOTA hydroxide solution (2.45 mmol/g) is diluted with 2.29 g of water. Once the solution is homogeneous, 1.51 g of Ludox HS-40 is added with stirring. The resulting mixture is almost clear and very runny. It is heated at 65° C. for 30 minutes and then allowed to age at room temperature for 90 minutes. This procedure gives a reaction mixture having mole ratios of 1 $SiO_2$: 0.60 DEOTA OH: 24.7 $H_2O$. The reaction mixture is sealed in a quartz ampoule and crystallization is allowed to take place at 135° C. under rotation at 60 rpm. Where appropriate, aqueous solutions of NaOH, KOH, and boric acid, or calcined pure-silica ZSM-5 or ZSM-11 crystals are added just prior to sealing the ampoule. Unless noted otherwise, the synthesis temperature is 135° C.

Example 3

Synthesis of MEL Zeolite

Since DEOTA is able to direct the synthesis of MEL for pure-silica systems, boron is added to the reaction mixtures to ascertain the effects of added heteroatoms. Reaction mixtures are prepared as described in Example 2 with $SiO_2/B_2O_3$ mole ratios of 60 or 28 and seeded with calcined ZSM-11 (made using TBA). They result in the crystallization of MEL in quantitative yield. The XRD powder patterns of these samples are indicative of pure-phase MEL. Both the 110 and 330 reflections are visible. The $^{11}$B solid-state NMR spectrum shows that the boron is incorporated into the framework, since only tetrahedral signals are observed. By elemental analysis, the Si/B ratios in the solid products are 49 and 34 for the reaction mixtures with $SiO_2/B_2O_3$ mole ratios of 60 and 28, respectively.

The MEL zeolite synthesized in the presence of DEOTA are composed of a rather monodisperse collection of crystallites. In the absence of alkali metal cations, the crystals are approximately 8 microns long. The addition of potassium cations to the synthesis mixture yields larger (12 microns) crystals of the same morphology.

Examples 4–10

Synthesis of MEL Zeolite

Using the procedure of Example 2, additional syntheses are performed using the components show in the table below and yielding the results shown in the table. For each synthesis, the $H_2O/SiO_2$ mole ratio is 25, the DEOTA OH/$SiO_2$ mole ratio is 0.6, and the temperature is 135° C.

| Ex. No. | M$^+$/SiO$_2$ | MFI | Rxn. Time (d) | Yield (based on SiO$_2$) |
|---|---|---|---|---|
| 4 | — | None | 41 | 15 |
| 5 | Na$^+$ (0.05) | None | 26 | 20 |
| 6 | K$^+$ (0.05) | None | 41 | 77 |
| 7 | — | 24% | 21 | 70 |
| 8 | — | 24% | 54 | 97 |
| 9 | Na$^+$ (0.08) | 24% | 22 | 94 |
| 10 | K$^+$ (0.08) | 24% | 22 | 78 |

Examples 11 and 12

Synthesis of B-MEL Zeolite

Using the procedure of Example 2, additional syntheses are performed using the components show in the table below and yielding the results shown in the table. For each synthesis, the $H_2O/SiO_2$ ratio is 23, the DEOTA OH/$SiO_2$ mole ratio is 0.55, ZSM-11/$SiO_2$ is 0.08, and the temperature is 135° C.

| Example No. | SiO$_2$/B$_2$O$_3$ | Reaction Time (d) | Product | Elemental Si/B in Product |
|---|---|---|---|---|
| 11 | 60 | 21 | MEL | 49 |
| 12 | 28 | 21 | MEL | 34 |

Example 13

Synthesis of All-Silica MEL (In fluoride medium)

0.63 Gram of a solution of DEOTA hydroxide (2.80 mmol/g) is added to 0.53 g of Ludox HS-40 colloidal silica with stirring, followed by 0.026 g of 9.3% aqueous NH$_4$F solution. 0.03 Gram of calcined pure-silica ZSM-11 is added as seeds. The reaction mixture is heated at 65° C. for 30 minutes, then allowed to age at room temperature for 90 minutes. The mixture is then placed in a quarz vessel and 0.16 g water is added. The quartz vessel is sealed and heated at 135° C. and rotated at 60 rpm for 25 days. A crystalline produce is recovered by filtration and washed with water. XRD shows the product to be ZSM-11, having the MEL crystal structure.

What is claimed is:

1. A process for preparing a zeolite having the MEL crystal structure which comprises:

(a) preparing an aqueous solution comprising a source of an oxide selected from the group consisting of oxides of silicon, germanium or mixtures thereof; and a 2,2-diethoxyethyltrimethylammonium cation;
(b) maintaining the aqueous solution under conditions sufficient to form crystals of a zeolite having the MEL crystal structure; and
(c) recovering the zeolite crystals.

2. The process of claim 1 wherein the aqueous solution further comprises a source of boron oxide.

3. The process of claim 1 wherein the aqueous solution further comprises a source of alkali metal oxide.

4. The process of claim 1 wherein the aqueous solution further comprises a source of boron oxide and a source of alkali metal oxide.

5. The process of claim 1 wherein said aqueous solution comprises, in terms of mole ratios, the following:

$OH^-/YO_2$ 0.2–0.8

$Q/YO_2$ 0.2–1.0

$H_2O/YO_2$ 15–100 where Y is silicon, germanium or mixtures thereof and Q is 2,2-diethoxyethyltrimethylammonium cation.

6. The process of claim 2 wherein said aqueous solution comprises, in terms of mole ratios, the following:

$YO_2/B_2O_3$ 20 or higher $OH^-/YO_2$ 0.2–0.8

$Q/YO_2$ 0.2–1.0

$H_2O/YO_2$ 15–100 where Y is silicon, germanium or mixtures thereof; and Q is 2,2-diethoxyethyltrimethylammonium cation.

7. The process of claim 3 wherein said aqueous solution comprises, in terms of mole ratios, the following:

$OH^-/YO_2$ 0.2–0.8

$Q/YO_2$ 0.2–1.0

$H_2O/YO_2$ 15–100

$M^+/YO_2$ 0.005–0.25 where Y is silicon, germanium or mixtures thereof; Q is 2,2-diethoxyethyltrimethylammonium cation and M is an alkali metal cation.

8. The process of claim 4 wherein said aqueous solution comprises, in terms of mole ratios, the following:

$YO_2/B_2O_3$ 20 or higher $OH^-/YO_2$ 0.2–0.8

$Q/YO_2$ 0.2–1.0

$H_2O/YO_2$ 15–100

$M^+/YO_2$ 0.005–0.25 where Y is silicon, germanium or mixtures thereof; Q is 2,2-diethoxyethyltrimethylammonium cation and M is an alkali metal cation.

9. A crystalline material composition, as-synthesized and in the anhydrous state, having the MEL crystal structure and whose general formula, in terms of oxide mole ratios is:

$Q/YO_2$ 0.03–0.05 where Y is silicon, germanium or mixtures thereof and Q is 2,2-diethoxyethyltrimethylammonium cation.

10. A crystalline material composition, as-synthesized and in the anhydrous state, having the MEL crystal structure and whose general formula, in terms of oxide mole ratios is:

$YO_2/B_2O_3$ 50 or higher $Q/YO_2$ 0.03–0.05 where Y is silicon, germanium or mixtures thereof and Q is 2,2-diethoxyethyltrimethylammonium cation.

11. A crystalline material composition, as-synthesized and in the anhydrous state, having the MEL crystal structure and whose general formula, in terms of oxide mole ratios is:

$Q/YO_2$ 0.03–0.05

$M^+/YO_2$ 0.005–0.25 where Y is silicon, germanium or mixtures thereof; Q is 2,2-diethoxyethyltrimethylammonium cation and M is an alkali metal cation.

12. A crystalline material composition, as-synthesized and in the anhydrous state, having the MEL crystal structure and whose general formula, in terms of oxide mole ratios is:

$YO_2/B_2O_3$ 50 or higher $Q/YO_2$ 0.03–0.05

$M^+/YO_2$ 0.005–0.25 where Y is silicon, germanium or mixtures thereof; Q is 2,2-diethoxyethyltrimethylammonium cation and M is an alkali metal cation.

* * * * *